United States Patent
Yamada

(10) Patent No.: US 8,867,056 B2
(45) Date of Patent: Oct. 21, 2014

(54) IMAGE FORMING APPARATUS AND METHODS OF FORMING IMAGES

(75) Inventor: Akihiro Yamada, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1314 days.

(21) Appl. No.: 11/535,404

(22) Filed: Sep. 26, 2006

(65) Prior Publication Data

US 2007/0070388 A1    Mar. 29, 2007

(30) Foreign Application Priority Data

Sep. 27, 2005 (JP) ................................. 2005-280563

(51) Int. Cl.
*G06K 15/00* (2006.01)
*G03G 15/00* (2006.01)
*G06K 15/02* (2006.01)
*G06F 3/12* (2006.01)

(52) U.S. Cl.
CPC ............ *G06K 15/02* (2013.01); *G03G 15/6538* (2013.01); *G06K 15/1823* (2013.01); *G03G 2215/00729* (2013.01); *G06K 15/005* (2013.01)
USPC ......................... 358/1.14; 358/1.15; 358/1.13

(58) Field of Classification Search
CPC ............ G06K 15/1823; G06K 15/005; G03G 2215/00729; G06F 3/1235; G06F 3/1252
USPC ........................................................ 358/1.14
See application file for complete search history.

(56) References Cited

U.S. PATENT DOCUMENTS

| | | | |
|---|---|---|---|
| 5,159,324 A * | 10/1992 | Ohtani et al. | 715/827 |
| 2003/0063151 A1* | 4/2003 | Bauer | 347/35 |
| 2003/0117635 A1* | 6/2003 | Roberts | 358/1.2 |
| 2005/0076215 A1* | 4/2005 | Dryer | 713/170 |

FOREIGN PATENT DOCUMENTS

| | | |
|---|---|---|
| JP | H07-157138 A | 6/1995 |
| JP | H09-116667 A | 5/1997 |
| JP | 2000355148 A | 12/2000 |
| JP | 2001018497 A | 1/2001 |
| JP | 2001257833 A | 9/2001 |
| JP | 2003-223523 A | 8/2003 |
| JP | 2004262078 A | 9/2004 |

OTHER PUBLICATIONS

Japanese Patent Office, Notice of Reasons for Rejection in Japanese Patent Application No. 2005-280563 (counterpart to the above-captioned U.S. Patent Application) mailed Dec. 9, 2008.

\* cited by examiner

*Primary Examiner* — Dov Popovici
(74) *Attorney, Agent, or Firm* — Baker Botts L.L.P.

(57) ABSTRACT

An image forming apparatus includes an accommodating unit configured to accommodate a recording medium; an image forming unit for forming an image on the recording medium in response to a print job; a reservation unit for designating a portion of the recording medium as a reserved amount and selectively prohibiting use of the reserved amount by the image forming unit; a determining unit for determining whether the print job is a reserved print job or a non-reserved print job; and a authorizing unit for permitting the image forming unit to use the reserved amount for the reserved print job. The reservation unit prohibits use of the reserved amount for the non-reserved print job.

10 Claims, 16 Drawing Sheets

IMAGE FORMING APPARATUS AND METHODS OF FORMING IMAGES

This application claims the benefit of Japanese Patent Application No. 2005-280563, filed Sep. 27, 2005, which is incorporated herein by reference.

BACKGROUND OF THE INVENTION

1. Field of the Invention

The invention relates to image forming apparatus and methods for forming images. In particular, the invention relates to image forming apparatus, which comprise a reservation unit for designating a portion of the recording media for a specific print job.

2. Description of Related Art

There has been hitherto provided an image forming apparatus in which reservation print is carried out by indicating a print time and the number of print copies. Japanese Published Patent Application No. 2004-262078 A discloses a technique in which reservation is accepted after it is confirmed that the number of necessary sheets is not more than the maximum loadable number of sheets when the reservation print is carried out.

According to this technique described in Japanese Published Patent Application No. 2004-262078 A, it may be checked to some degree at the print reservation time whether the number of sheets will run short or not during execution of the reserved print. Nevertheless, the technique as described in the above publication cannot avoid such a disadvantage that loaded sheets have been wasted before reserved print is started, so that the number of sheets runs short during execution of the reserved print.

SUMMARY OF THE INVENTION

A need has arisen for an image forming apparatus that may reserve a required amount of recording media in advance for a specific printing job.

In order to satisfy this need, according to an embodiment of the invention, an image forming apparatus includes an accommodating unit configured to accommodate a recording medium; an image forming unit for forming an image on the recording medium in response to a print job; a reservation unit for designating a portion of the recording medium as a reserved amount and selectively prohibiting use of the reserved amount by the image forming unit; a determining unit for determining whether the print job is a reserved print job or a non-reserved print job; and a authorizing unit for permitting the image forming unit to use the reserved amount for the reserved print job. The reservation unit prohibits use of the reserved amount for the non-reserved print job.

According to another embodiment of the invention, a method of forming an image may comprise the steps of: designating a portion of a recording medium as a reserved amount; prohibiting use of the reserved amount for a print job; determining whether the print job is a reserved print job or an unreserved print job; permitting use the reserved amount for the reserved print job; and forming the image on the designated portion of the recording medium for the reserved print job. Further, the method may comprise the steps of: detecting a residual amount of the recording medium; permitting the image to be formed on an available amount of the recording medium, wherein the available amount is equal to a difference between the residual amount and the reserved amount for print jobs other than the reserved print job; and forming the image on the residual amount for the reserved print job. The method also may comprising the step of: identifying a specific user originating the print job to determine whether the print job is the reserved print job. In addition, the method may comprise the steps of: receiving identification information; storing at least one password; and confirming whether the received identification information corresponds to at least one of the at least one password, wherein when the identification information is confirmed to correspond to at least one of the at least one password, the amount corresponding to the portion of the recording medium is set as the reserved amount and the reserved amount corresponding to the portion of the recording medium is prohibited for use for image forming.

Further objects, features, and advantages of the present invention will be understood from the following detailed description of preferred embodiments of the present invention with reference to the accompanying figures.

BRIEF DESCRIPTION OF THE DRAWINGS

Embodiments of the invention now are described with reference to the accompanying figures, which are given by way of example only, and are not intended to limit the invention.

For a more complete understanding of the invention, the needs satisfied thereby, and the objects, features, and advantages thereof, reference now is made to the following description taken in connection with the accompanying drawings.

DETAILED DESCRIPTION OF EMBODIMENTS

A preferred embodiment according to the invention will be described hereunder with reference to the accompanying drawings.

1. Whole Construction

Figure 1:
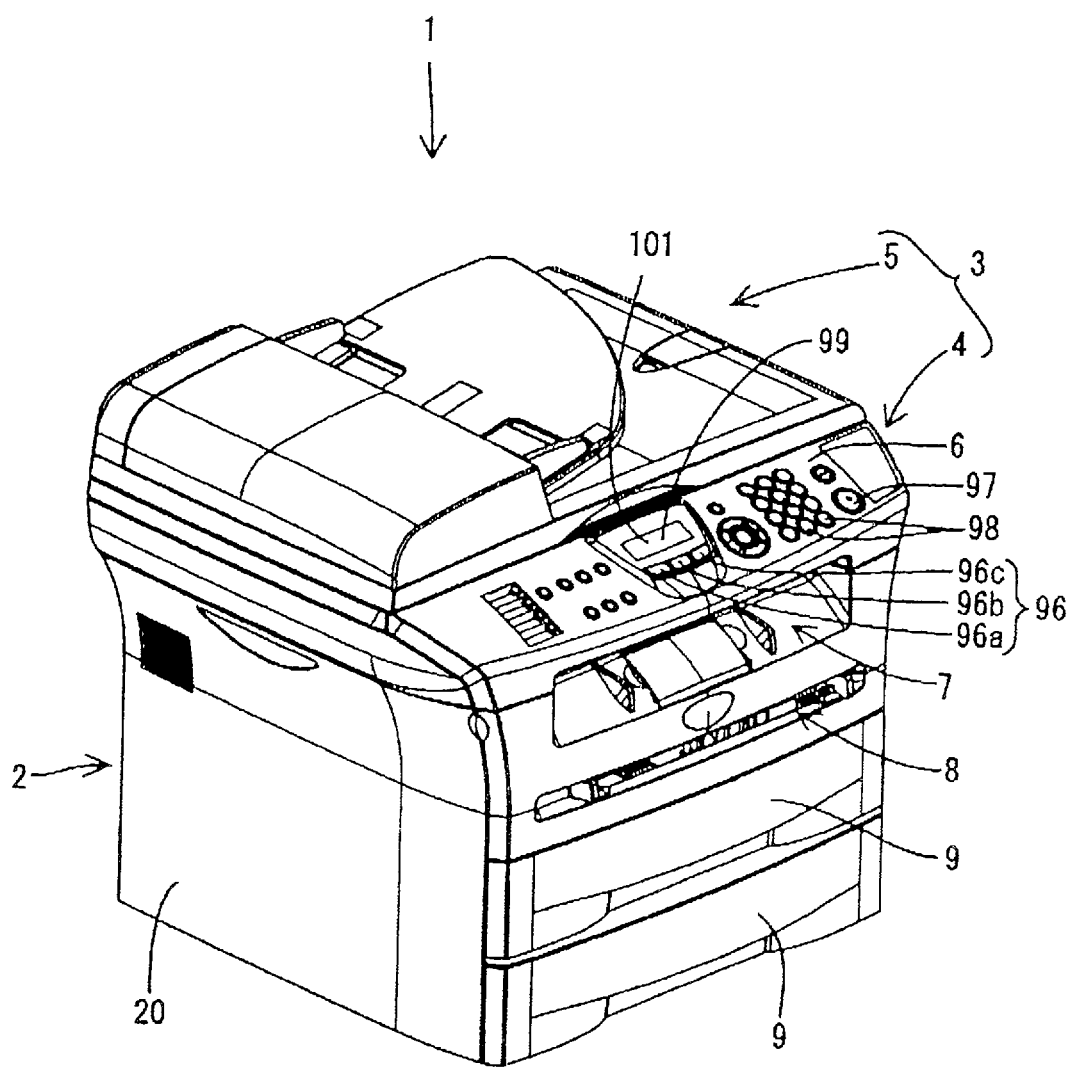
FIG. 1 is a perspective view showing the outlook of a multi function printer according to a first embodiment of the present invention.
Figure 2:
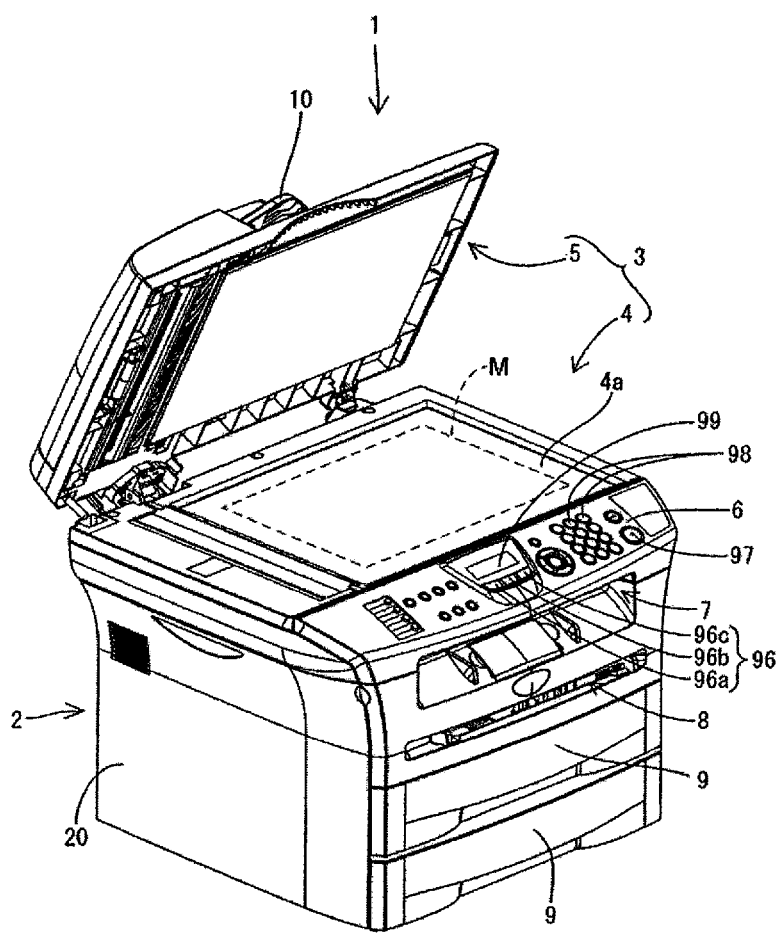
FIG. 2 is a perspective view showing a state that a reading unit is opened in the multi function printer of FIG. 1.

An image forming apparatus according to an embodiment of the invention is a multi-function printer 1 (hereinafter referred to as "printer 1") having a printer function, a scanner function, a copy function, a facsimile function, and the like. FIG. 1 is a perspective view showing the outlook of printer 1, and FIG. 2 is a perspective view showing printer 1 when a reading unit 3 is opened.

Printer 1 comprises with an image forming unit 2 containing a feeder portion 21, and an image forming portion 22 (see FIG. 3) and an automatic feeding document reading unit 3 (hereinafter referred to as "reading unit 3"). As shown in FIGS. 1 and 2, reading unit 3 is equipped with an image reading device 4 having a rectangular document table 4a provided on the top surface thereof, and an automatic document feeding device (hereinafter referred as "ADF 5") disposed so as to cover the document table 4a. As shown in FIG. 2, reading unit 3 is pivotably supported so that the rear end side thereof at the opposite side to an operating portion 6 is rotatable at the rear end side of the top surface of image forming unit 2.

The operating portion 6 through which various kinds of operations may be executed by a user is provided at one end side (to the lower right side on the sheet surface in FIG. 1) of image reading device 4.

Operating portion 6 is provided with a mode selecting switch 96, a start key 97, various kinds of operation buttons 98 and a touch panel 99 of a liquid crystal display.

Mode selecting switch 96 may select any mode of three kinds of function modes (modes for enabling the respective operations of the printer function, the scanner function, and the copy function). Specifically, three mode keys of a copy mode key 96a for selecting a copy mode, a FAX mode key 96b for selecting a FAX (facsimile) mode and a scanner mode key 96c for selecting a scanner mode are provided in juxtaposition with one another in the right-and-left direction.

Start key 97 is a switch for starting the operation based on the function mode, and when it is pressed (e.g., activated and turned on) in the copy mode, copying of a document (e.g., an original document) distributed onto (e.g., placed on) document stand 4a is started. Further, when start key 97 is pressed in the FAX mode or the scanner mode, the FAX transmission document reading operation, the scanner document reading operation or the like is executed.

Touch panel 99 is designed so that a setting menu button (not shown) is displayed by a predetermined operation, and a display relating to each kind of setting is displayed by touching the setting menu button.

Further, a sheet take-out hole 7 which is opened so as to intercommunicate with a sheet discharge tray 2a (FIG. 3, described later) is formed at the lower side of operating portion 6. A slit-type manual sheet feeding port 8 extending in the horizontal direction is formed at the lower side of sheet take-out hole 7, and two sheet (paper) supply cassettes 9 are disposed in a two-stage arrangement at the lower side of the manual sheet feeding port 8 so as to be detachable from the same surface side as the surface on which operating portion 6 and related components are disposed.

In the following description, a surface side of printer 1 at which operating portion 6 is provided (the lower right side on the sheet surface in FIG. 1) is defined as "front side," and the opposite side (the upper left side on the sheet surface in FIG. 1) is defined as "rear side".

(Image Forming Unit)

Figure 3:
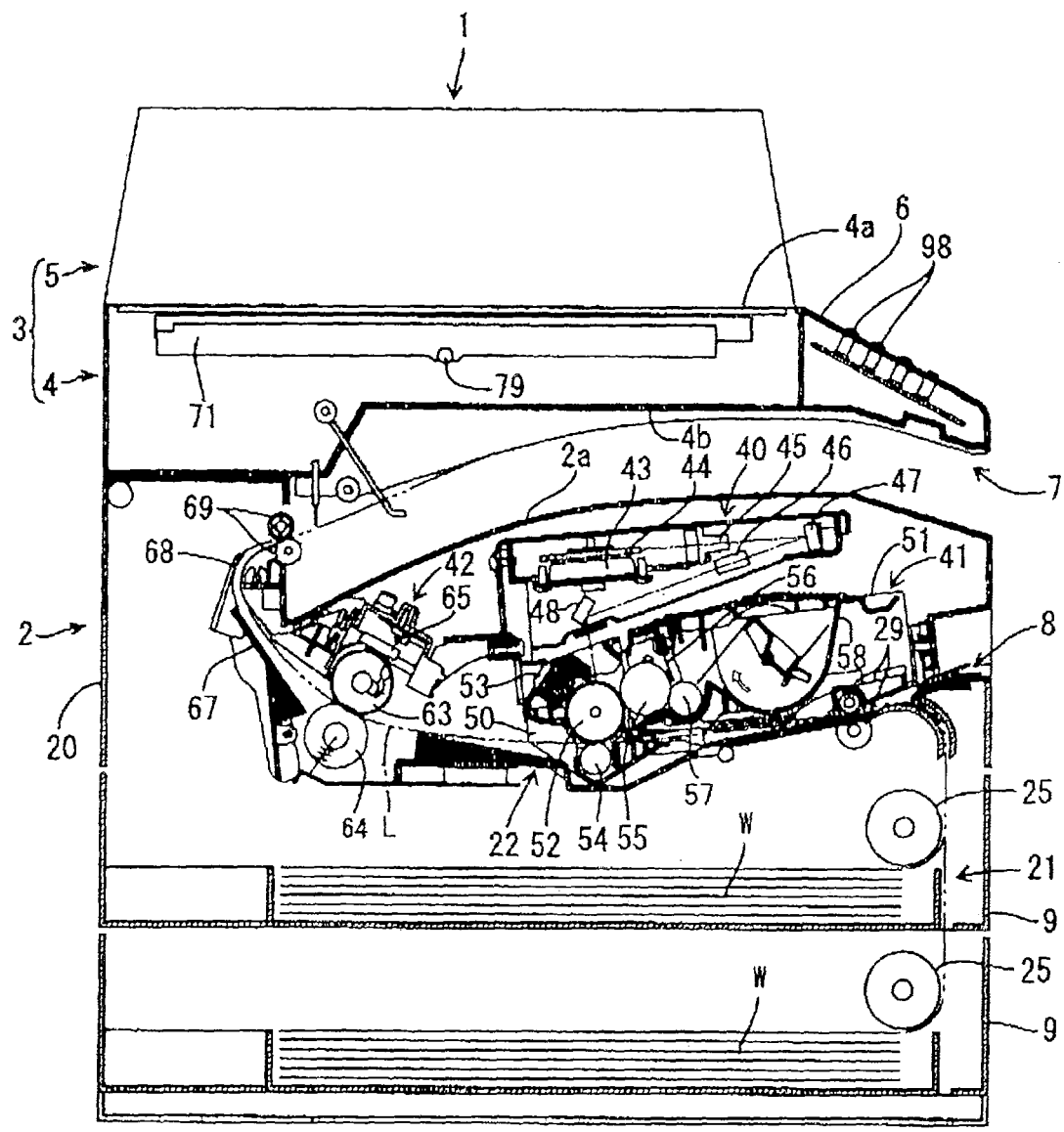
FIG. 3 is a side cross sectional view showing the main part of the multi function printer of FIG. 1.

The construction of image forming unit 2 will be described with reference to FIG. 3. FIG. 3 is a side cross-sectional view showing the main part of printer 1 when viewed from the axial direction of a sheet feeding roller 25. In FIG. 3, the right side on the sheet surface corresponds to the front side of printer 1, and the left side on the sheet surface corresponds to the rear side of printer 1.

A feeder portion 21 for supplying sheets W, an image forming portion 22 for forming a predetermined image on a sheet W thus supplied, etc. are provided in the casing 20 of the image forming unit 2. Further, a sheet discharge tray 2a used to hold a sheet W which has an image formed thereon by image forming portion 22 and discharged is disposed at the upper portion of image forming portion 22.

Feeder portion 21 is constructed by two sheet supply cassettes 9, a swingable sheet press plate (not shown) provided in each sheet supply cassette 9, a sheet feeding roller 25 provided at the upper side of the front end side end portion of each sheet supply cassette 9, and related components.

Each sheet supply cassette 9 is detachably mounted at the lower portion in casing 20 so as to accommodate the sheets W therein so that the sheets are stacked in sheet supply cassette 9. Each sheet cassette 9 is designed so that the uppermost sheet W is successively fed out by sheet feeding roller 25, and sheet W thus fed is moved through a feeding passage to a resist roller 29 side.

Resist roller 29 comprises a pair of rollers, and the driving/stopping operation of resist roller 29 is controlled by a controller (not shown) on the basis of a detection timing from a position sensor (not shown) disposed in the neighborhood of sheet feeding roller 25. Skewing of the sheet W is corrected by the above control.

Image forming portion 22 comprises a scanner unit 40, a process unit 41, and a fixing unit 42.

As shown in FIG. 3, scanner unit 40 is provided to the upper portion in casing 20, and it is equipped with a laser beam emitting portion (not shown), a polygon mirror 44 rotated by a polygon motor 43, lenses 45 and 46, reflection mirrors 47 and 48, etc. A laser beam based on predetermined image data emitted from the laser beam emitting portion is successively passed or reflected through or from polygon mirror 44, lens 45, reflection mirror 47, lens 46 and the reflection mirror 48 in this order, and then irradiated onto the surface of a photosensitive drum 52 of a process unit 41 described later while scanned at high speed.

Printer 1 is provided with process unit 41, so that the process unit 41 is detachable from the main body portion of image forming unit 2.

Processor unit 41 is constructed by a drum cartridge 50 and a developing cartridge 51.

Drum cartridge 50 of process unit 41 comprises a photosensitive drum 52, a scorotron-type electrifier 53 and a transfer roller 54. Developing cartridge 51 comprises a developing roller 55, a layer thickness regulating blade 56 which is pressed on the developing roller 55 under pressure, a toner supply roller 57, and a toner box 58 filled with toner (e.g., a developing agent).

Photosensitive drum 52 is disposed clockwise rotatably at the side position of developing roller 55 so as to face developing roller 55.

Scorotron-type electrifier 53 is a positive electrifying scorotron-type electrifier, and it is spaced from the photosensitive drum at a predetermined interval so that it is not in contact with photosensitive drum 52.

In connection with the rotation of photosensitive drum 52, the surface of photosensitive drum 52 is first uniformly positively electrified by scorotron-type electrifier 53, and then it is exposed to a laser beam from scanner unit 40 while scanned at a high speed, thereby forming an electrostatic latent image based on predetermined image data on the surface of photosensitive drum 52.

Subsequently, by the rotation of developing roller 55, toner which is carried on developing roller 55 and positively electrified is supplied to the electrostatic latent image formed on the surface of photosensitive drum 52 when developing roller 55 is confronted to and bought into contact with photosensitive drum 52.

Transfer roller 54 is disposed at the lower side of photosensitive drum 52 so as to face photosensitive drum 52, and supported in drum cartridge 50 so as to be rotatable in the counterclockwise direction. A visible image carried on the surface of photosensitive drum 52 is transferred onto a sheet W while the sheet W passes through photosensitive drum 52 and transfer roller 54.

Fixing unit 42 is disposed at the downstream side (e.g., the rear side) of the process unit 41 in the sheet feeding direction, and it is equipped with a heating roller 63 for heating and melting the toner transferred onto the sheet, a press roller 64 that is disposed so as to face the heating roller 63 and presses the sheet being fed toward the heating roller 63, and a thermostat 65.

In fixing unit 42 as described above, heating roller 63 heats and pressurizes the toner transferred onto the sheet W in the process unit 41 while the sheet W passes through heating roller 63 and press roller 64 to fix the toner.

Further, the heating roller 63 feeds the sheet W having an image fixed thereon to a discharge roller 69 through a sheet discharge path formed by guide members 67 and 68. Discharge roller 69 discharges the sheet W thus fed onto sheet discharge tray 2a.

(Reading Unit)

Reading unit 3 is equipped with image reading device 4 and ADF 5, and image reading device 4 is disposed at the upper side of sheet discharge tray 2a of image forming unit 2, so that lower surface 4b thereof faces sheet discharge tray 2a so as to cover sheet discharge tray 2a.

Reading unit 3 is constructed by a flat bed-type scanner. In the flat bed-type construction, when ADF 5 is opened backwardly, document table 4a is exposed to the outside. See FIG. 2. Accordingly, under the state that a book or each of other kinds of documents is placed on document table 4a, it may be read at the copying time or the like.

The reading of a document M is carried out in a case where document M is placed on document table 4a or a case where ADF 5 is used. When document M is read out under the state that document M is placed on document table 4a, CIS (contact image sensor) 71 is moved along a shaft 79 extending along the feeding direction of the document M and also along document table 4a. At this time, document M placed on document table 4a is read out line by line. On the other hand, when ADF 5 is used, CIS 71 is moved to the left end side of the document table 4a and kept there, and then document M fed by ADF 5 is read out line by line.

(Electrical Construction)

Figure 4:
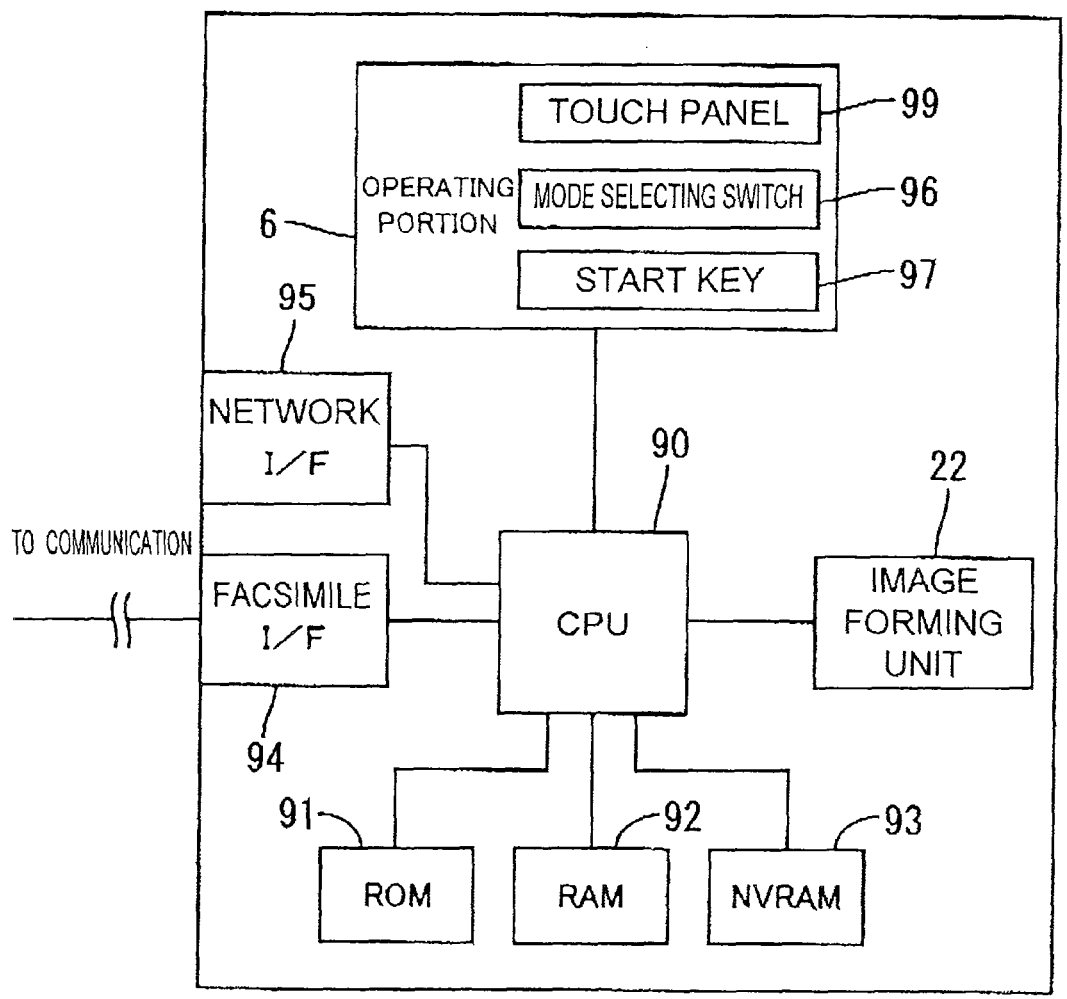
FIG. 4 is a block diagram showing the electrical construction of the multi function printer of FIG. 1.

FIG. 4 shows an electrical construction of printer 1. Printer 1 is equipped with operating portion 6 for accepting various kinds of input operation, image forming portion 22 for carrying out reading and printing of image data and heating and fixing through fixing unit 42, ROM 91, RAM 92, NVRAM 93 (non-volatile memory), CPU 90, a facsimile interface 94 connected to a communication line such as a telephone line or the like, and a network interface 95 connected to a computer (not shown).

2. Feature Portion

Next, the feature portion of printer 1 according to this embodiment is described.

In printer 1, image forming portion 22 forms an image on a sheet W accommodated in sheet supply cassette 9 according to a print job which is transmitted from a computer or the like or generated in printer 1, and also an amount corresponding to some of the sheets W (a part of the recording medium) accommodated in sheet supply cassette 9 is set as an unusable amount to prohibit use of the amount of the sheets W (i.e., the unusable amount of the sheets W) unless a predetermined condition is satisfied (that is, the amount corresponding to some of the accommodated sheets may be reserved in advance). After the prohibition (reservation) is set, it is judged in the printer 1 whether the achieved print job satisfies the predetermined condition or not (that is, whether the print job is a prohibition-releasable specific job or not). If the print job satisfies the predetermined condition, the prohibition of the use of the sheets is released, and the unusable amount of the sheets may be permitted to be used. When the print job is not the specific job, the unusable amount of the sheets is prohibited from being used, and printing is carried out on sheets within the range corresponding to the difference between the present amount and the unusable amount.

Figure 5:
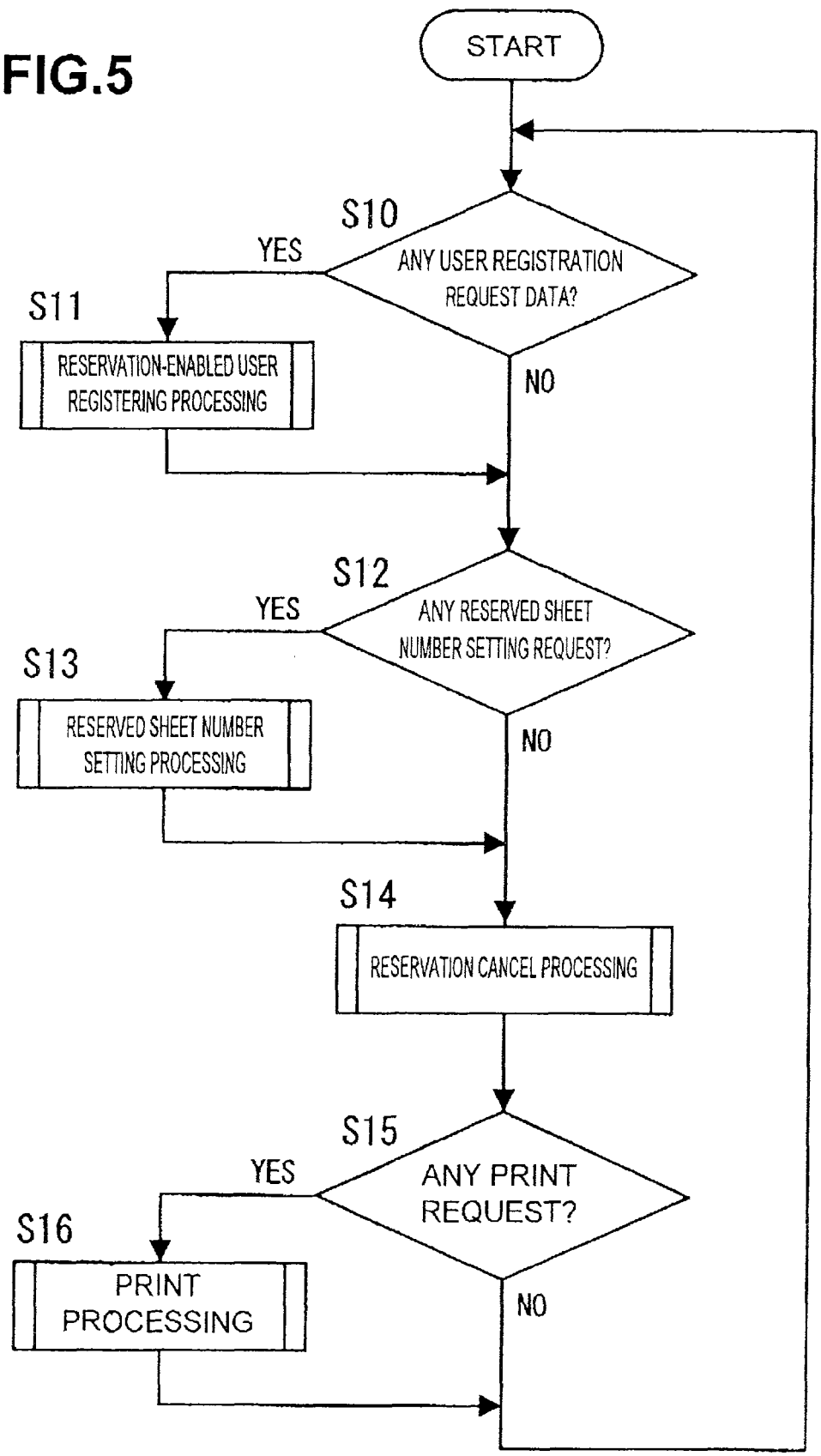
FIG. 5 is a flowchart showing a routine of the processing in the multi function printer.

The flow of the printing job processing is described with respect to FIG. 5. FIG. 5 shows a main routine of the image forming apparatus. This main routine is started on the basis of power-on as a condition. In this main routine, it is first judged whether there exists data for requesting user registration (user registration request data). The use registration request data are generated and stored by user's operation of operating portion 6.

Figure 6:
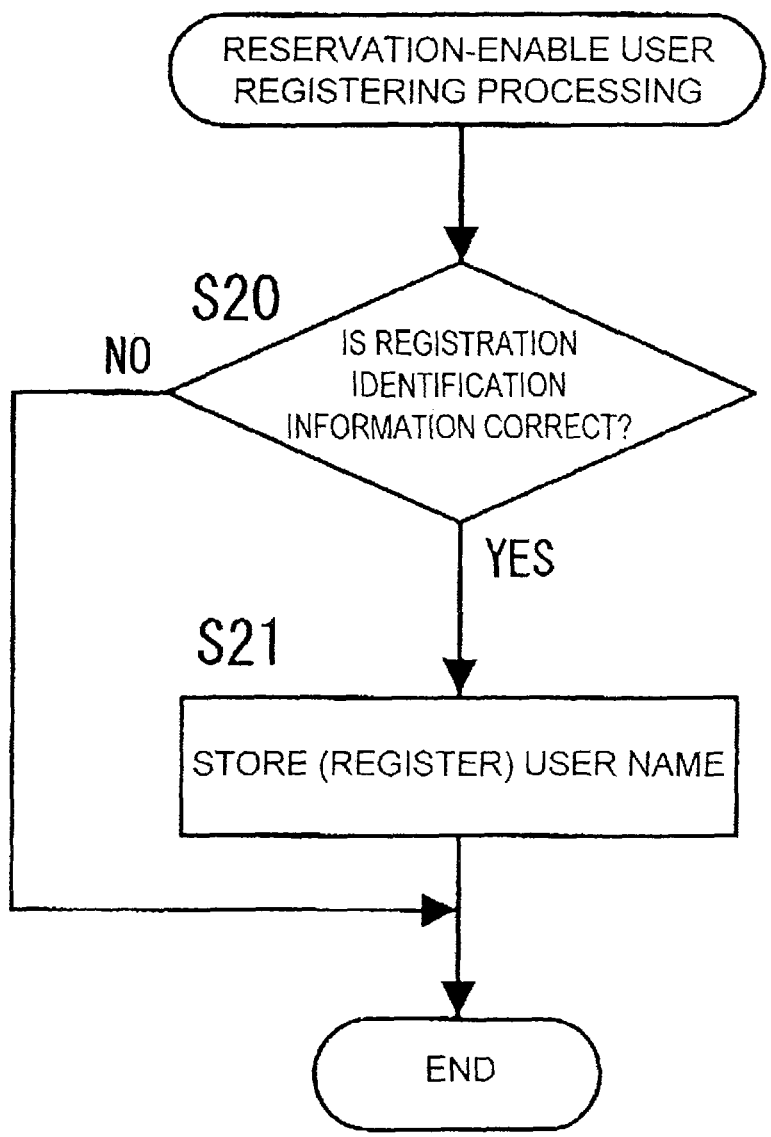
FIG. 6 is a flowchart showing the flow of reservation-possible user registration processing.

If user registration request data exists (i.e., the processing goes to YES in step S10), reservation-allowable user registration processing of S11 is carried out. In this processing, a user who may be set in user-based setting processing described later is registered in advance. As shown in FIG. 6, this processing promotes the user to input registration identification information (data for identifying a user who is permitted to be registered), and then it is judged whether registration identification information input by the user is correct or not (that is, it is judged whether the input information is coincident with authentic registration identification information stored in a storage unit such as ROM 91 or the like in advance) (S20). When the input registration identification information is correct (i.e., the processing goes to YES in step S20), the name of the user is stored in S21. The user name thus registered is used in the user-based setting processing (FIG. 17) described later. Through this processing, reservation is permitted to only the user to whom the registration identification information is given.

Returning to FIG. 5, if no user registration request data exists in S10 or the processing of S11 is finished, it is judged whether there is any reserved sheet-number request in S12. If a reserved sheet-number request is provided by user's operation of the operating portion 6 (i.e., the processing goes to YES in S12), reserved sheet-number setting processing of S13 is executed. In the reserved sheet-number setting processing, the amount corresponding to some of sheets W accommodated in sheet supply cassette 9 is set as an unusable amount, and use of the reserved amount of sheets W by others is prohibited (e.g., the sheets W are reserved).

Figure 7:
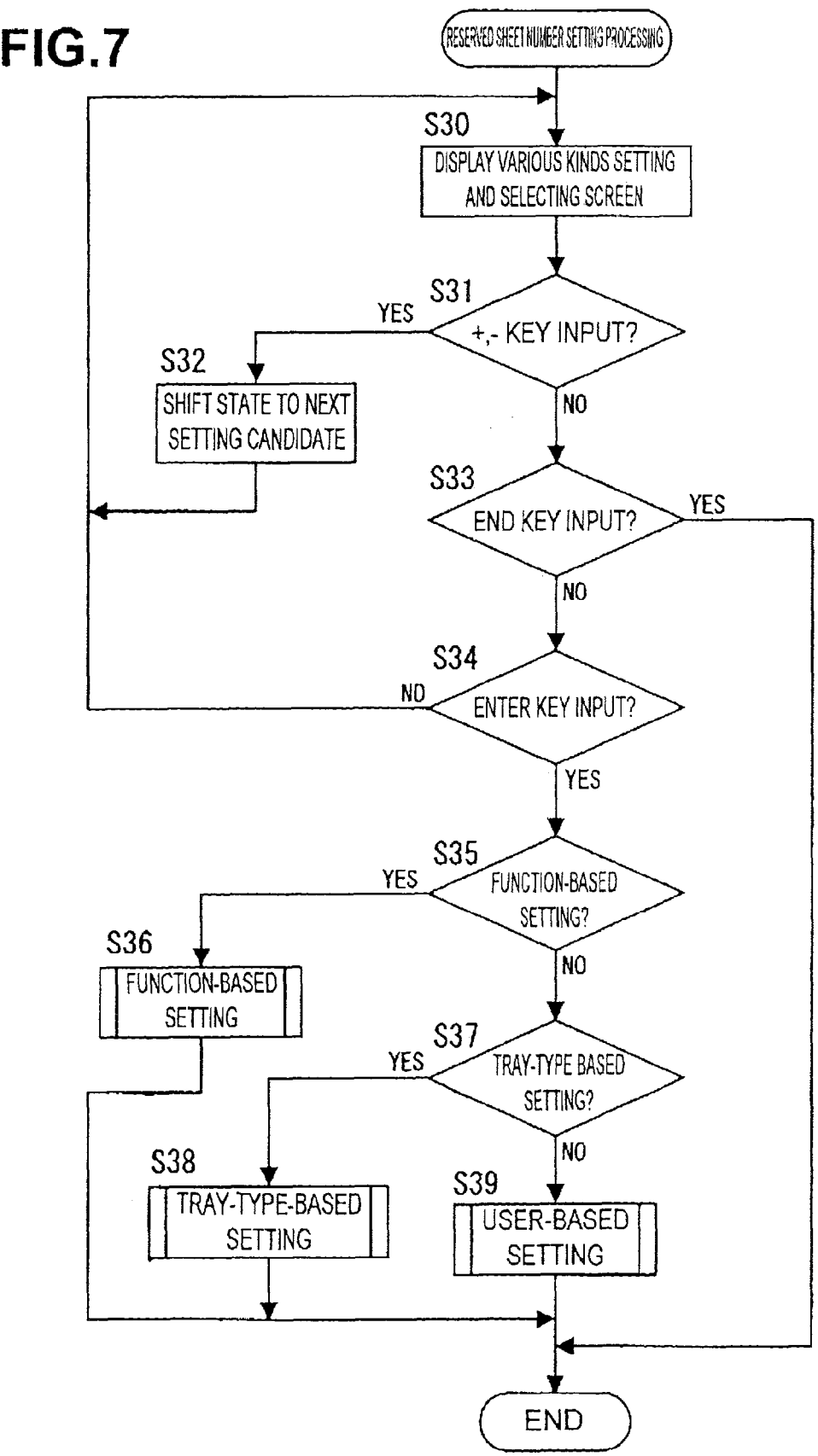
FIG. 7 is a flowchart showing the flow of reserved sheet number setting processing.
Figure 9:
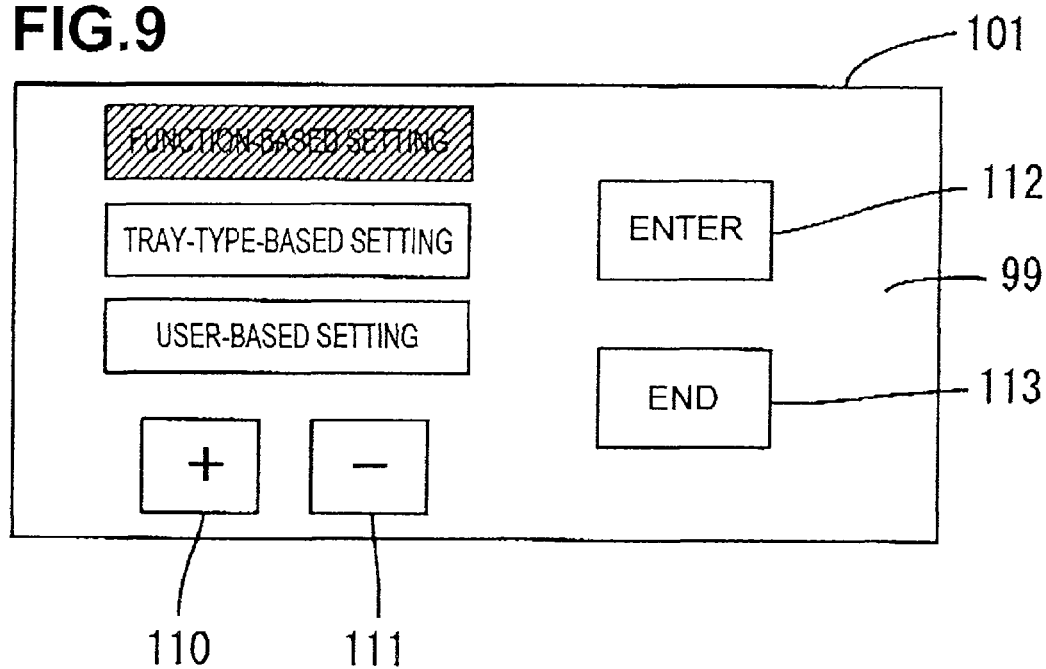
FIG. 9 is a diagram showing a display example in the reserved sheet number setting processing.

First, as shown in FIG. 7, a screen for selecting various kinds of setting is displayed in S30. This screen displays a display frame on which function-based setting, tray-type-based setting and user-based setting may be selected in display portion 101 constructed by touch panel 99, as shown in FIG. 9. In default, any one of the function-based setting, the tray-type-based setting and the user-based setting is selected (in FIG. 9, the function-based setting is selected). If +key 110 or −key 111 is selected, the processing goes to YES in S31, and the selection state is shifted from the present choice to a next setting candidate (S32). On the other hand, if neither +key 110 nor −key 111 is selected and an end key 113 is input, the processing goes to YES in S33 and the processing concerned is finished. If none of +key 110, −key 111, and end key 113 is not selected and an enter key 112 is selected under the state that any one of the settings is selected, the processing goes to NO in S31 and S33, and also goes to YES in S34.

In S35, it is judged whether the choice concerned is the selection of the function-based setting. If the function-based setting is selected, the processing goes to YES in S35, and the function-based setting processing described later is executed in S36. If the choice is not the function-based setting, but the tray-type-based setting, the processing goes to NO in S35 and also goes to YES in S37 to execute the tray-type-based setting processing described later in S38. Further, if the choice is the user-based setting, the processing goes to NO in S37, and the user-based setting processing described later is executed in S39.

As described above, printer 1 is equipped with the copy function, the printer function and the facsimile function. In this embodiment, as shown in steps S36, S38 and S39, the unusable amount is set every function, and the use of sheets may be reserved, so that the user may secure sheets every function. In this construction, the achieved print job is judged as a specific job only if it corresponds to the reserved (prohibited) function (conversely, the prohibition or reservation is not released by print jobs other than the reservation target function).

Figure 8:
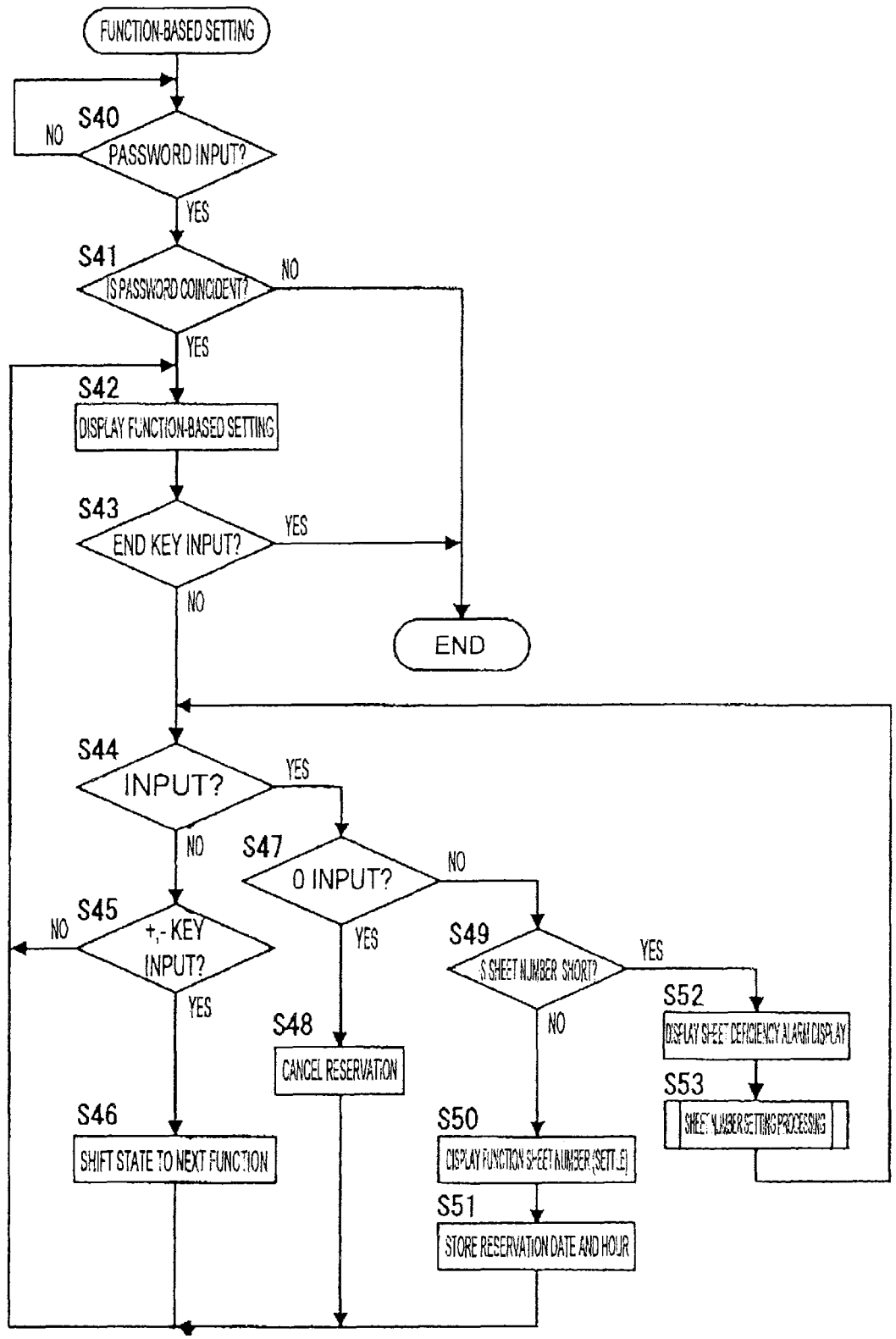
FIG. 8 is a flowchart showing the flow of function-based setting processing.

Next, the function-based setting processing is described with reference to FIG. 8.

First, password input is promoted on display portion 101, and it is also judged whether a password is input or not. If a password is input on the operating portion 6, the processing goes to YES in S40, and it is judged whether the password is coincident with a authentic one in S41. If it is not coincident with the authentic password, the processing goes to NO in S41, and the processing concerned is finished. If it is coincident with the authentic password, the information associated with the function-based setting is displayed in S42. As described above, according to this embodiment, it is checked in the judgment processing of CPU 90 (specifically, the judgment processing of S41) whether the password corresponding to identification information is authentic or not. If it is confirmed as the authentic one, the amount corresponding to some of sheets accommodated in sheet supply cassette 9 is set as an unusable amount to reserve (prohibit use) of the unusable amount of sheets. Accordingly, the reservation (e.g., prohibition of use) of sheets may be managed by the password, and the reservation of sheets may be restricted under a fixed condition.

Figure 10:
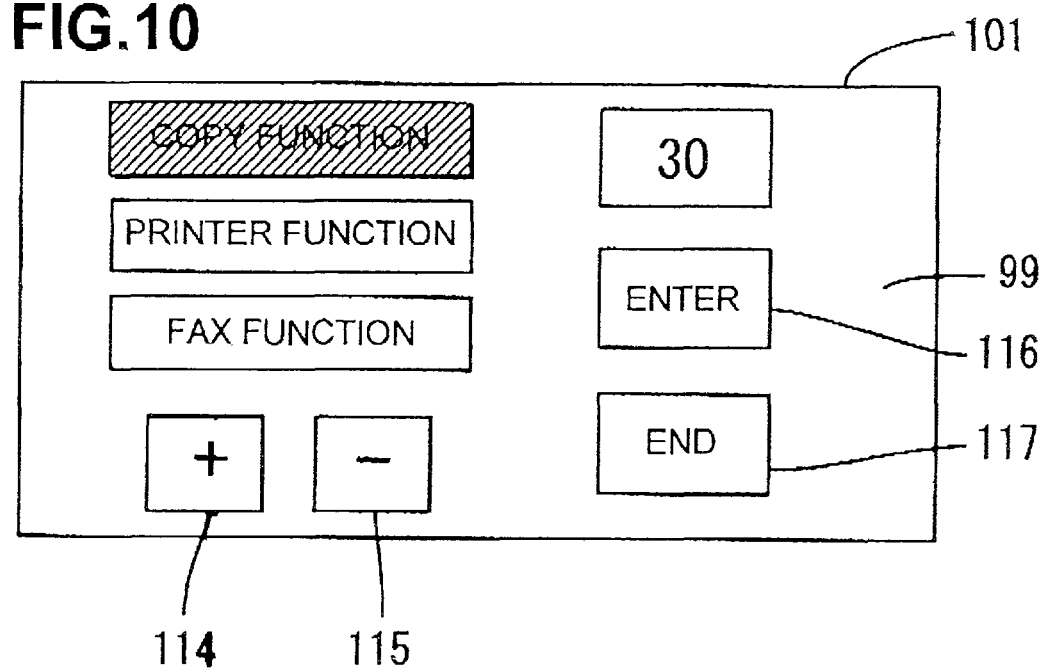
FIG. 10 is a diagram showing a display example in the function-based setting processing.

A display as shown in FIG. 10 is made in S42. In this case, the functions of the printer 1 are displayed as being selectable, and a selected function and a displayed number of sheets may be settled in association with each other. The number of sheets (sheet number) may be changed by input from operating portion 6. If the end key 117 is input on the screen of FIG. 10, the processing goes to YES in S43, and the processing concerned is finished. If any function is selected and the enter key 116 is input, the processing goes to YES in S44. If enter key 116 is not input, but +key 114 or −key 115 is pressed, the processing goes to YES in S45. In S46, the selection state is shifted from the displayed function to a next function.

On the other hand, if the processing goes to YES in S44, it is judged in S47 whether the set number (the displayed number of sheets in FIG. 10) is equal to zero. If it is equal to zero, the processing goes to YES in S47 to delete the reservation of the function concerned in S48. If the set number is not equal to zero, the processing goes to NO in S47, and it is judged whether the present amount of paper (the present number of sheets) is less than the reserved amount of paper (reserved number of sheets) in S49. If the present number of sheets is not insufficient, the processing goes to NO in S49, and the reserved number of sheets for the function concerned is displayed in S50 to settle the reservation. Then, the date and hour of the reservation is stored in S51.

Figure 11:
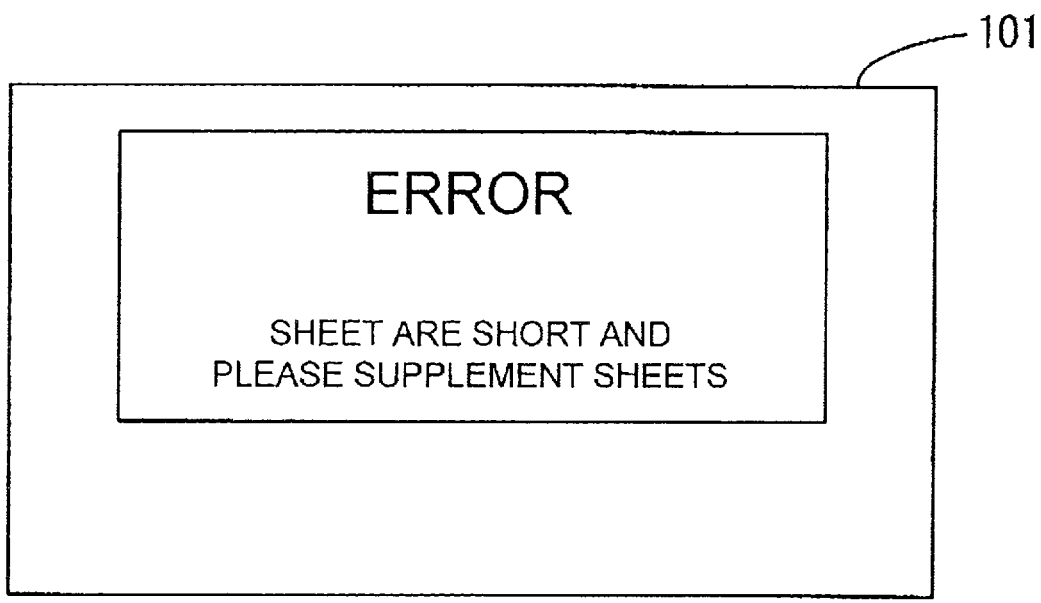
FIG. 11 is a diagram showing an alarm display example.

On the other hand, it is judged in S49 whether the present amount of paper (the present number of sheets) is less than the reserved amount of paper (reserved number of sheets), that is, the indicated amount of paper (the indicated number of sheets) is greater (larger) than the amount of paper (the number of sheets) accommodated in paper (sheet) supply cassette 9, an alarm display is made to indicate that the paper (sheets) is lack in S52, and the paper amount (sheet number) setting processing is carried out in S53. FIG. 11 shows an example of the alarm display. Accordingly, the user may easily grasp that it is not normal to secure a desired amount of paper (a desired number of sheets), and thus the user may easily take a proper action promptly.

Figure 12:
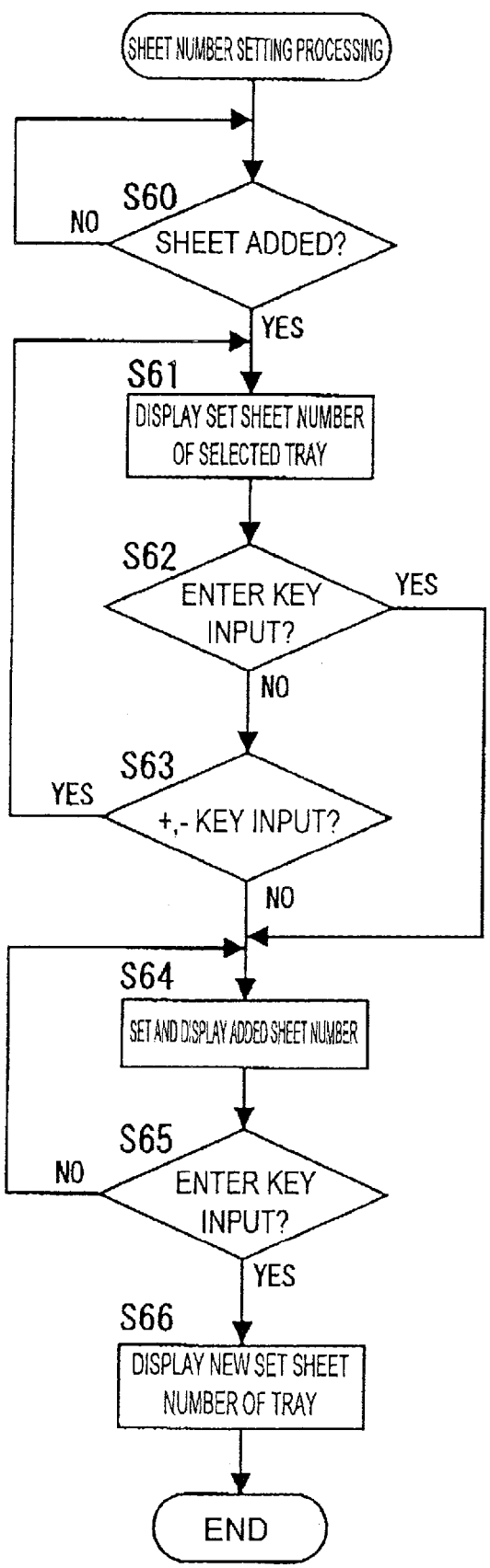
FIG. 12 is a flowchart showing the flow of sheet number setting processing.

Next, the sheet number setting processing is described with reference to FIG. 12.

Figure 13:
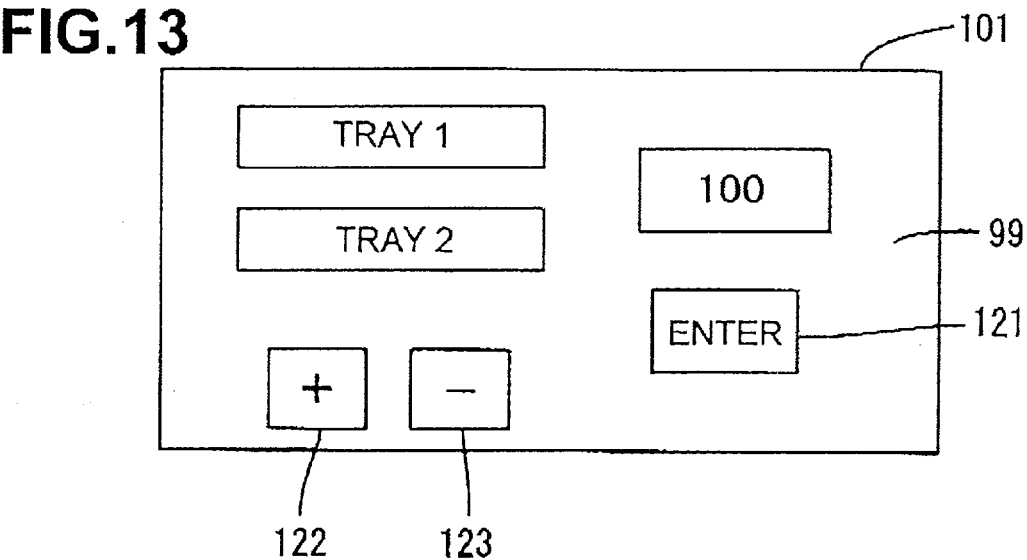
FIG. 13 is a diagram showing a display example 1 in the sheet number setting processing.
Figure 14:
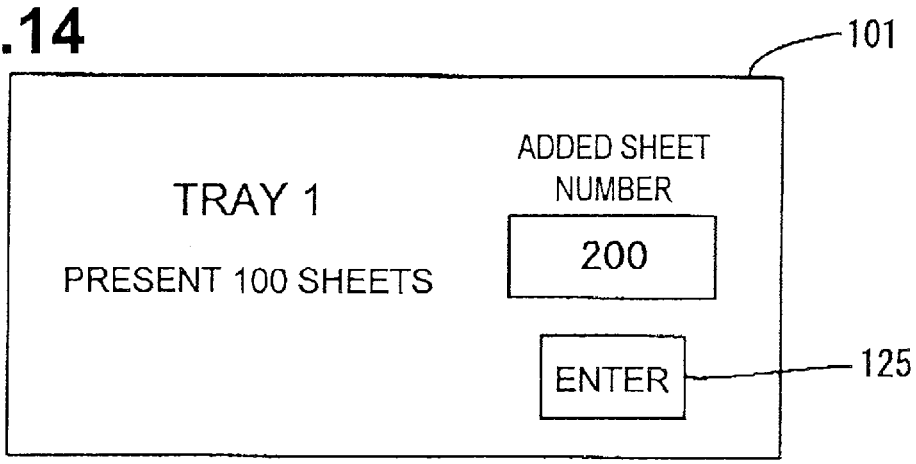
FIG. 14 is a diagram showing a display example 2 in the sheet number setting processing.
Figure 15:
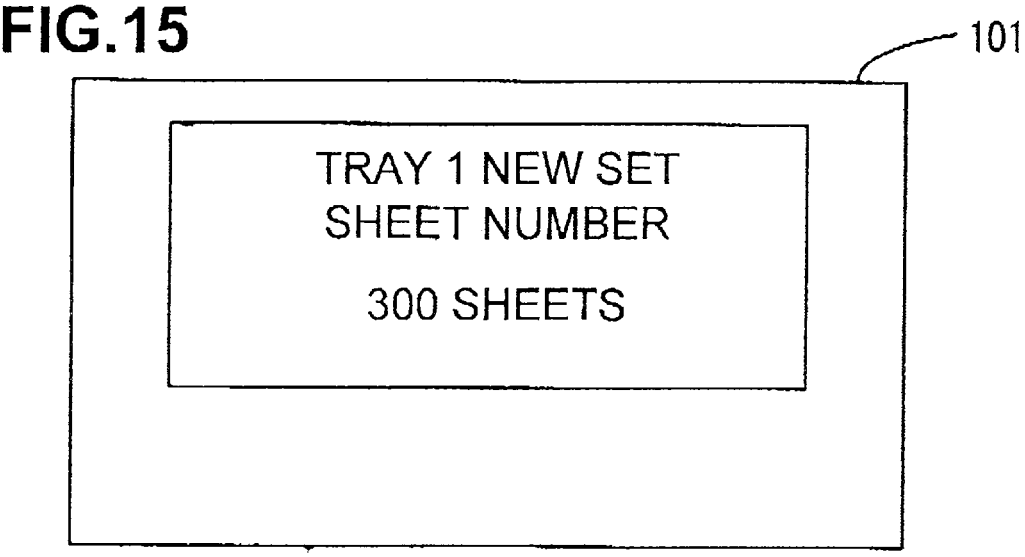
FIG. 15 is a diagram showing a display example 3 in the sheet number setting processing.

In the sheet number setting processing, it is first judged in S60 whether an additional operation of sheets is carried out or the like. In this case, information indicating that sheets is added to a desired sheet supply cassette 9 (hereinafter merely referred to as tray) is input by operating portion 6, and it is judged on the basis of the information concerned whether the sheet adding operation has been carried out or not. Alternatively, the sheet adding operation may be judged by checking whether any tray opening operation has been carried out. If the sheet adding operation has been carried out, the processing goes to YES in S60, and the present set number of sheets of the selected tray is displayed as shown in FIG. 13 in S61. If the enter key 121 is input, the processing goes to YES in S62. If not, enter key 121, but +key 122 or −key 123 is input, the processing goes to NO in S62 and also to YES in S63, and returns to S61 again to shift the select to a next tray and display the state thereof as in the case of FIG. 13. If the processing goes to YES in S62, an additional sheet number setting screen for the tray selected in S64 is displayed. The additional sheet number setting screen may be constructed as shown in FIG. 14, and the present number of sheets and the additional number of sheets for the selected tray are displayed. The additional number of sheets may be properly changed by an input on operating portion 6. If enter key 125 is input, the processing goes to YES in S65 to display a new set number of sheets for the tray on which the sheet addition has been carried out as shown in FIG. 15. In the function-based setting processing of FIG. 8, after the sheet number setting processing is finished as described above, the processing of S44 and subsequent steps is repeated.

Figure 16:
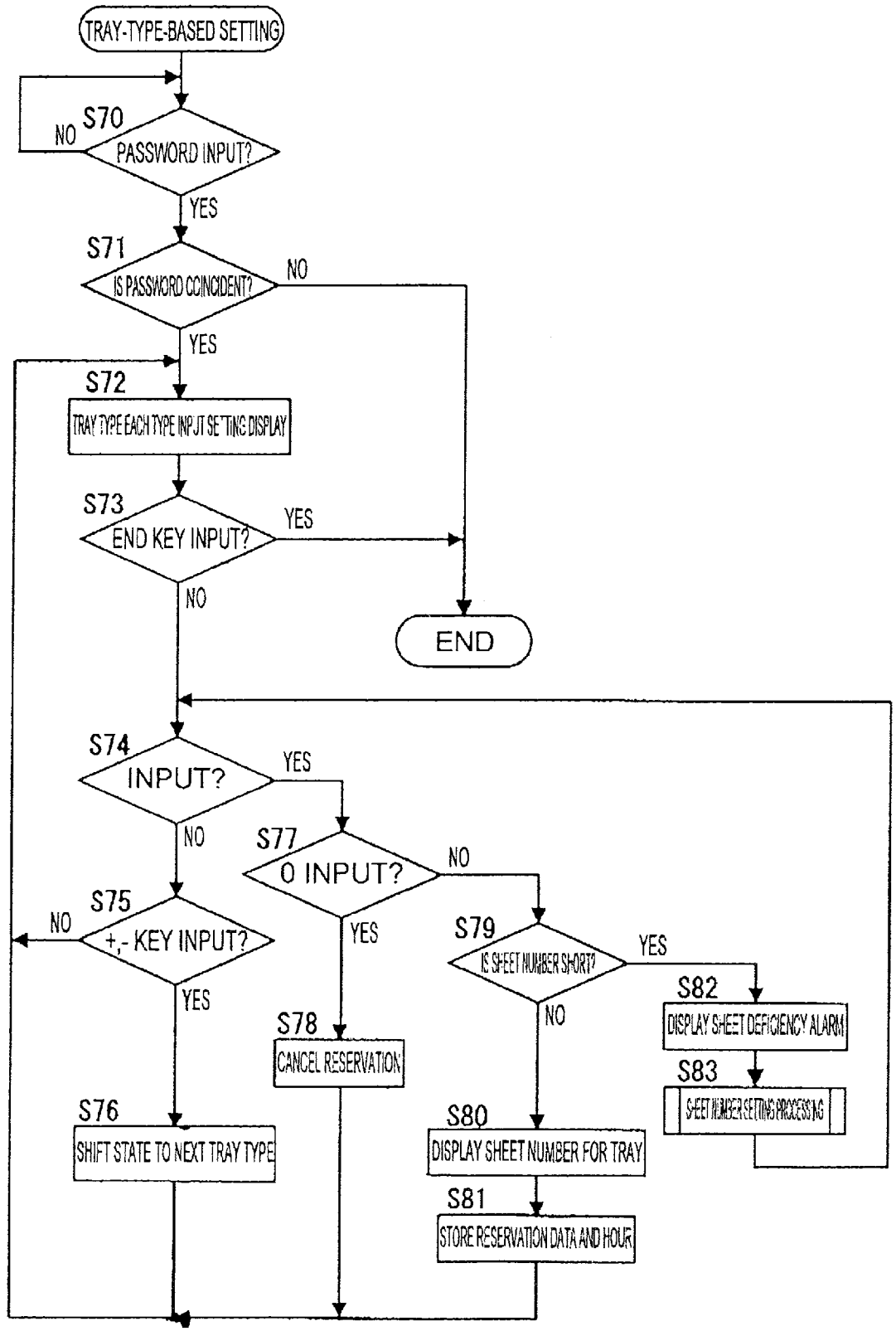
FIG. 16 is a flowchart showing the flow of tray-type-based setting processing.

The setting processing based on tray type is described with reference to FIG. 16. In the setting processing based on tray type, the reserved number of sheets may be set every tray as in the case of the function-based setting processing in which the reserved number of sheets may be set every function. In this processing, as in the case of the processing of S40 and S41 of FIG. 8, input of the password corresponding to identification information is checked in S70, S71. If an authentic password (identification information) is input, an input setting screen of each tray is displayed in S72. This setting screen may be constructed as in the case of FIG. 10, and the construction that each function may be selected in FIG. 10 may be modified so that each tray may be selected. Respective buttons 114, 115, 116, 117 and the sheet number display may be constructed as in the case of FIG. 10. The processing from S73 to S83 is the same as the processing from S43 to S53 of FIG. 8, and thus the detailed description is omitted. Nevertheless, the judgment of S77 and the judgment of S79 are made on the basis of the press of the enter key under the state that any one tray and any one sheet number are associated with each other on the setting screen as in the case of FIG. 10. If the input sheet number is equal to zero, the reservation for the tray selected in S78 is deleted. If the input sheet number does not exceed the present amount (present sheet number) of the selected tray, the reservation is settled in S80, and the reservation date and hour is stored in S81. If the sheet number runs short, an alarm display is made in S82, and the same sheet number setting processing as S53 is executed in S83. As described above, according to the tray-type-based setting processing, if it is confirmed in the judgment processing of CPU 90 (specifically, the judgment processing of S71) that the password (identification information) is authentic, the amount corresponding some of sheets accommodated in sheet supply cassette 9 is set as an unusable amount, and use of the sheets by image forming portion 22 is prohibited.

Figure 17:
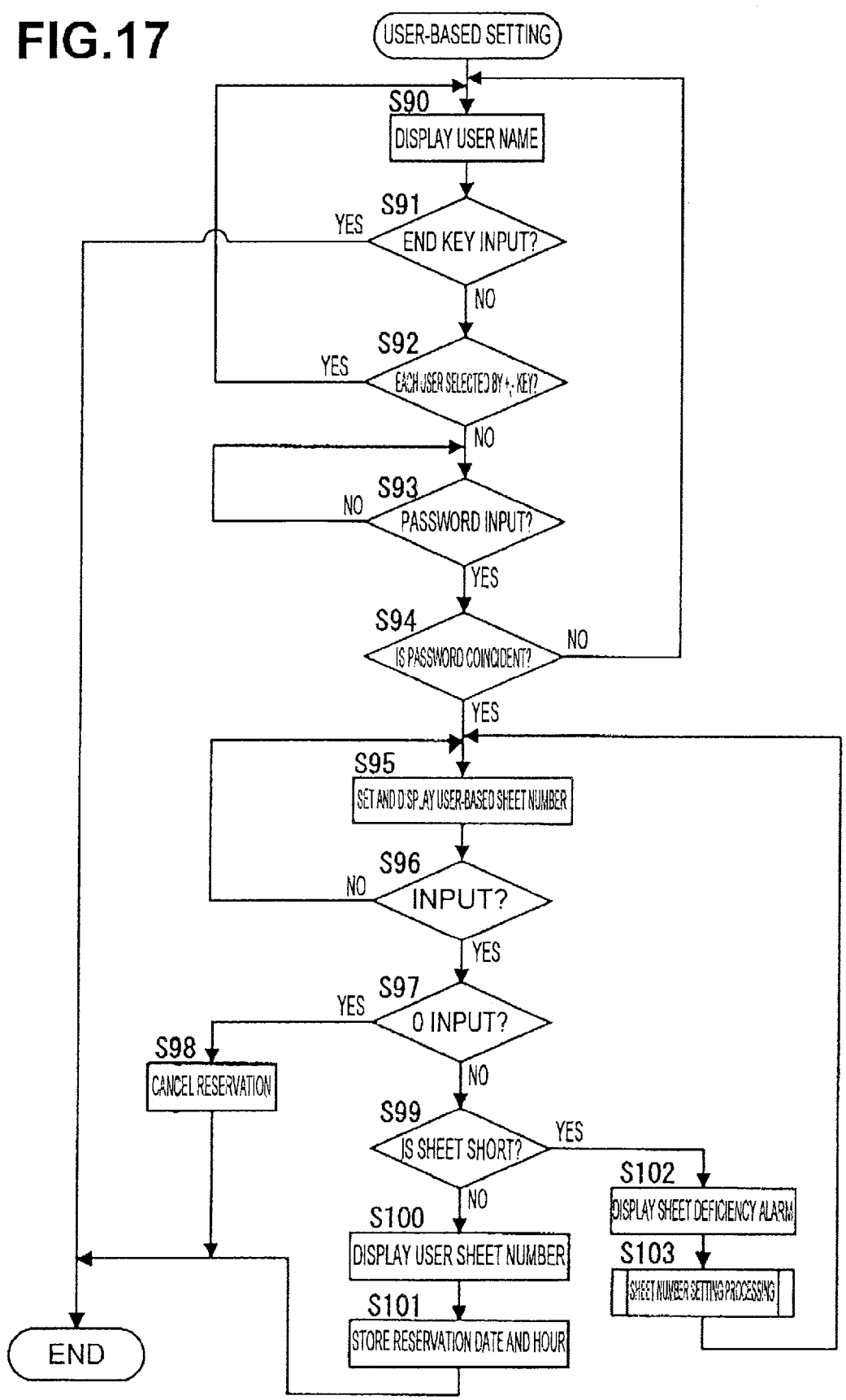
FIG. 17 is a flowchart showing the flow of user-based setting processing.
Figure 18:
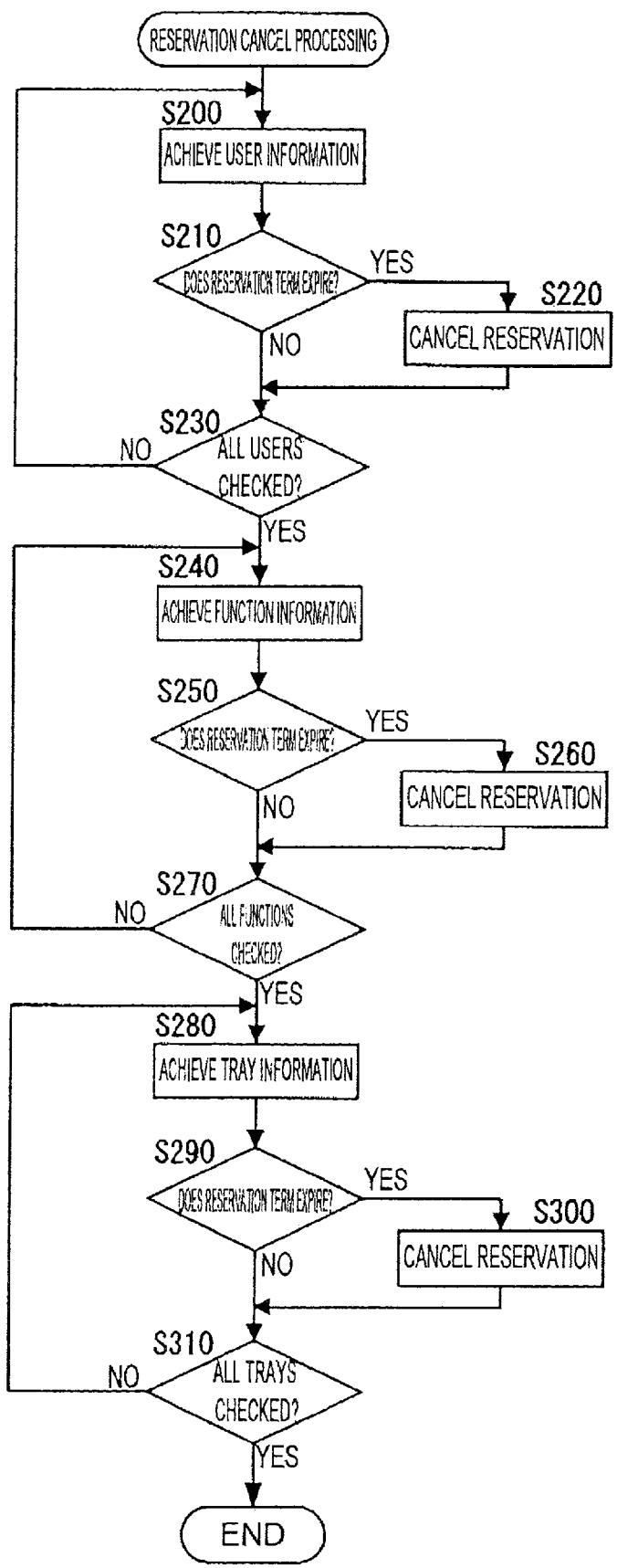
FIG. 18 is a flowchart showing the flow of reservation cancel processing.
Figure 19:
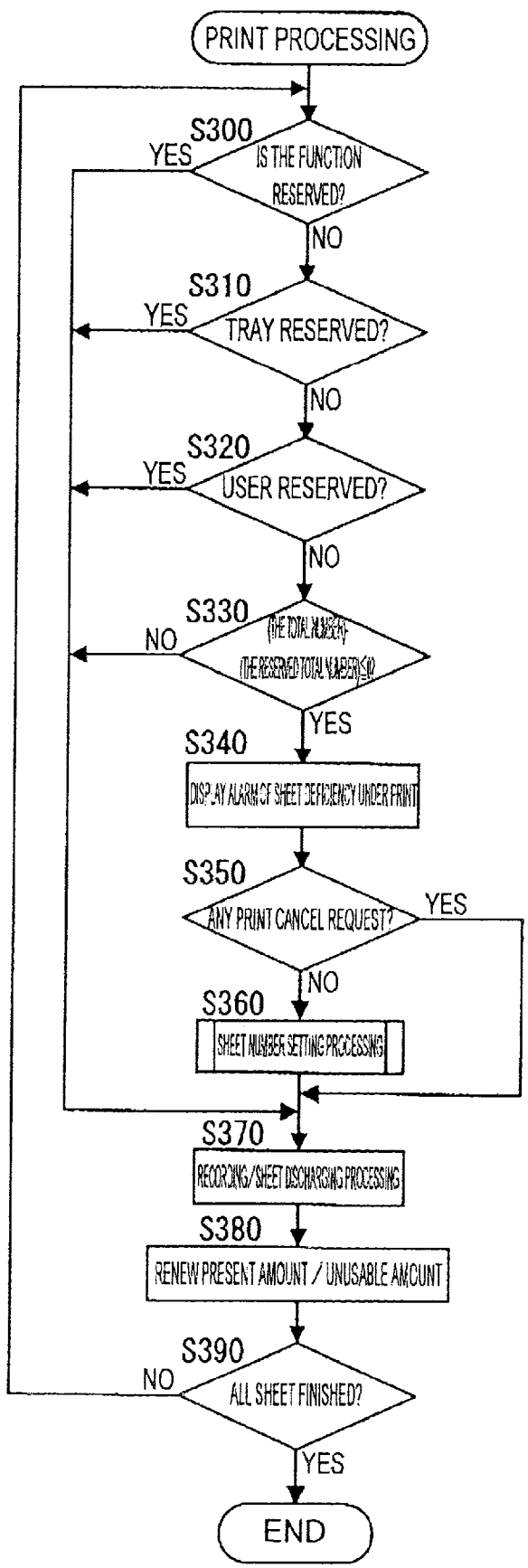
FIG. 19 is a flowchart showing the flow of print processing.

The user-based setting processing is described with reference to FIG. 17. In the user-based setting processing, registered user names are displayed as being selectable. The user names are registered in the processing of FIG. 6. If the end key is input on the setting screen, the processing goes to YES in S91 and the processing is finished. Further, the user selection state may be changed by the operation of the +key and the –key. If the +key or the –key is selected, the processing goes to NO in S91 and also to YES in S92, and the selected state is changed and displayed again in S90. If any one user is selected and settled, the processing goes to NO in S91 and also to NO in S92. In S93, input of the password corresponding to identification information is promoted and it is judged whether a password (identification information) is input or not. If the password is input and it is coincident with a authentic one, the processing goes to YES in S93 and also goes to YES in S94 to display the user-based sheet number setting screen in S95. On this screen are displayed the selected user name, the sheet number and the enter key. The displayed sheet number may be properly changed by the input of operating portion 6. If the enter key is input under the state that the sheet number is displayed, the processing goes to YES in S96 and it is judged whether the set sheet number is equal to zero. If the set sheet number is equal to zero, the processing goes to YES in S97, and the reservation for the user concerned is deleted. If the set sheet number is not equal to zero, the processing goes to NO in S97, and it is judged whether the set sheet number exceeds the present amount (e.g., number) of sheets accommodated in sheet supply cassette 9. If the set sheet number exceeds the present amount and thus the present amount runs short, the processing goes to YES in S99, and the same alarm display as S52 of FIG. 8 is carried out in S102. Further, the same sheet number setting processing as S53 of FIG. 8 is carried out in S103. If the set sheet number does not exceed the present amount, the processing goes to NO in S99, the reservation for the user selected in S100 is settled and the reservation data and hour is stored in S101. As described above, in the user-based setting processing, when it is judged in the judgment processing of CPU 90 (specifically, the judgment processing of S94) that the password (identification information) is authentic, the amount corresponding to some of sheets accommodated in sheet supply cassette 9 is set as an unusable amount, and use of the sheets by image forming portion 22 is prohibited.

The reservation cancel processing now is described. The reservation cancel processing is the processing constituting a part of the main routine shown in FIG. 5, and reservation information for any user is first achieved in S200. Then, it is judged in S210 whether the reservation term of the user concerned expires. If the reservation term expires, the processing goes to YES in S210, the reservation of the user is released in S220, and then the processing shifts to S230. When the reservation term does not expire, the processing goes to NO in S210, the reservation of the user concerned is not released, and it is judged in S230 whether the check of all the users is finished or not. If the check concerned has not yet been finished, the processing goes to NO in S230, and the processing of S200, S210, and S220 for the reservation of any residual user is likewise repeated. When the check for all the users is finished, the processing goes to YES in S230, and the processing shifts to the check of the function-based reservation.

First, the reservation information for each function is achieved in S240. Then, it is judged in S250 whether the reservation term of the function concerned expires. If the reservation term expires, the processing goes to YES in S250, the reservation of the function concerned is released in S260, and then the processing shifts to S270. When the reservation term does not expire, the processing goes to NO in S250, the reservation for the function concerned is not released, and it is judged whether the check of all the functions is finished in S270. If the check concerned has not yet been finished, the processing goes to NO in S270, and the processing of S240, S250, S260 for the reservation of any residual function is likewise repeated. When the check of all the functions has been finished, the processing goes to YES in S270, and the processing shifts to the check of the tray-based reservation.

First, the reservation information of any one tray is achieved in S280. Then, it is judged in S290 whether the reservation term of the tray expires. If the reservation term expires, the processing goes to YES in S290, the reservation of the tray concerned is released in S300, and then the processing shifts to S310. If the reservation term does not expire, the processing goes to NO in S290. The reservation of the tray concerned is not released, and it is judged in S310 whether the check of all the trays is finished or not. If the check concerned is not finished, the processing goes to NO in S310, and the processing of S280, S290, S300 is likewise repetitively carried out on the reservation of the residual trays. If the check of all the trays is finished, the processing goes to YES in S310 and then the processing concerned is finished.

As described above, according to the printer 1 of this embodiment, the reservation state may be released, so that printer 1 may be easily adapted to variation of the situation like a case where necessity of prohibition is subsequently vanished or the like. Further, when the reservation state is continued for a predetermined term, the prohibition state is released. Therefore, the release of the prohibition state may be effectively prevented from being forgotten.

The print processing now is described. When a print job is achieved in printer 1 concerned by transmission from a computer or the like or the processing in the printer 1, it is first judged whether any reservation for a function exists in the print job. If a reservation exists, the processing goes to YES in S300. If no reservation for a function exists in the print job, the processing goes to NO in S300, and it is judged in S310 whether any reservation for a tray associated with the print job exists. If a reservation for the tray associated with the print job exists, the processing goes to YES in S310. If no reservation for the tray associated with the print job exists, the processing goes to NO in S310, and it is judged in S320 whether any reservation for a user associated with the print job exists. If a reservation for the user associated with the print job exists, the processing goes to YES in S320. In this processing, if any reservation exists, in the recording/sheet discharging processing of S370, print is carried out within a range containing sheets whose amount is set as an unusable amount in the reservation concerned.

On the other hand, if no reservation exists, it is judged in S330 whether the value achieved by subtracting the reserved total number of sheets from the total number of sheets after the print is finished is equal to zero or less. If it is equal to zero or less, the amount of sheets would run short during print, and thus an alarm display indicating this fact is made in S340. If a cancel request for the print is provided in response to the alarm display, the processing goes to YES in S350. If no cancel request is provided, the sheet number setting processing is carried out in S360. The sheet number setting processing is the same processing as S53 of FIG. 8 (i.e., the processing of FIG. 12). In this embodiment, when the amount (number) of sheets which are not set reserved targets is equal to zero under the state that some of sheets are set as reserved targets (prohibited targets), this fact is informed (some of sheets have been reserved). Accordingly, the user may be informed of the reason why the image formation is not carried out although sheets are accommodated.

In the recording/sheet discharge processing of S370, on the basis of whether the print job is a reserved specific function, it is judged whether the print job concerned is a specific job (e.g., reservation-releasable job) or not, and then printing is carried out. Further, on the basis of whether the print job is a reserved specific tray, it is judged whether the print job is a specific job, and then printing is carried out. Further, on the basis of whether the print job is based on a print instruction from a reserved specific user, it is judged whether the print job is a specific job or not, and then printing is carried out.

Further, in the recording/sheet discharge processing, the present amount of sheets accommodated in sheet supply cassette 9 is specified, and with respect to a print job which is not a specific job as a reservation target (a prohibition target), printing is carried out within the range achieved by subtracting the unusable amount of sheets from the present amount of sheets. With respect to a specific job to which use of sheets as reservation targets is permitted, printing is carried out within the range corresponding to the present amount of sheets. Accordingly, the use of sheets may be prohibited after the present amount is checked, and thus the management of the number of sheets may be properly performed.

After the recording/sheet discharge processing is finished, the present amount and the unusable amount (reserved amount) are renewed in S380. The present amount is renewed by subtracting the number of sheets consumed in S370 from the present amount of sheets. Further, the unusable amount is renewed as follows. That is, when image formation is carried out on a predetermined amount (number) of sheets according to a specific job to which use of sheets is permitted, a new unusable amount achieved by subtracting the predetermined amount from the present unusable amount is set. In this construction, the unusable amount (number) of sheets may be successively renewed according to the specific job, and thus the unusable amount may be properly kept, so that an excessive amount of recording medium may be prevented from being secured. After this processing is finished, it is judged whether all the print jobs are finished in S390. If all the print jobs are not finished, the processing goes to NO in S390, and the processing of S300 and subsequent steps is repetitively carried out on the unfinished print jobs. If all the print jobs are finished, the processing concerned is finished.

As described above, according to the construction of this embodiment, with respect to the printing of print jobs other than the specific jobs, use of the amount corresponding to a part of accommodated recording medium may be prohibited. Accordingly, the recording medium may be secured for the specific jobs, and thus the construction of this embodiment is effective to an image forming apparatus, etc. which may perform reserved printing.

In the construction as described above, the following operation is carried out. When totally one hundreds sheets exist in two sheet supply cassettes 9 and a user A reserves forty sheets, the user A may carry out printing on all the one hundred sheets containing the reserved forty sheets. Nevertheless, a user B who does not make a reservation may carry out printing on only sixty sheets achieved by subtracting the reserved forty sheets from the one hundred sheets accommodated in the sheet supply cassettes 9.

As another example, in a case where totally two hundred sheets exist in two sheet supply cassettes 9 and also fifty sheets are reserved for the facsimile function, when printing is carried out on the basis of the facsimile function, the total two hundred sheets containing the reserved fifty sheets may be printed. Nevertheless, when printing is carried out on the basis of another function (copying function or the like) which is not reserved, only one hundred and fifty sheets achieved by subtracting the reserved fifty sheets from the two hundred sheets accommodated in sheet supply cassettes 9 may be printed.

Other Embodiments

The invention is not limited to the embodiment described above with reference to the drawings. For example, the following embodiments are contained in the subject matter of the invention, and also various modifications may be made and implemented without departing from the subject matter of the invention.

(1) In the above embodiment, the multi function printer having the copying function, the facsimile function and the printer function is described as the image forming apparatus. Nevertheless, other kinds of image forming apparatuses such as a color laser printer, a monochromatic type laser printer, etc. which are equipped with neither the copying function nor the facsimile function insofar as they may form images.

(2) In the above embodiment, the display portion 101 comprising LCD is used as the alarm unit. Nevertheless, other display units such as a lamp, etc. may be used or a sound unit such as a buzzer or the like may be used.

(3) In the above embodiment, the image forming apparatus is equipped with two trays. Nevertheless, the image forming apparatus may be equipped with three or more trays. Conversely, the image forming apparatus may be equipped with only one tray.

(4) In the above embodiment, the identification information input unit and the indicating unit are constructed by operating portion 6. Nevertheless, the identification information input unit and the indicating unit may be constructed by a computer or other devices.

(5) In the above embodiment, data are input by a user and the residual amount of sheets is grasped on the basis of the count of the number of printed sheets. Nevertheless, the residual amount of sheets may be grasped by the other detection means. For example, the residual amount of sheets may be grasped by using a sensor unit such as an optical sensor or the like.

(6) In the above embodiment, when a reservation is made by the user-based setting processing or the function-based setting processing, some sheets are reserved from all the sheets accommodated in the two sheet supply cassettes 9. Nevertheless, the reservation may be made in association with each sheet supply cassette 9 every user. In this case, for example, it is possible that a user A reserves twenty sheets accommodated in one sheet supply cassette 9 and a user B reserves thirty sheets accommodated in the other supply cassette 9.

Likewise, the reservation may be made in association with each sheet supply cassette 9 every function. In this case, for example, it is possible that twenty sheets accommodated in one sheet supply cassette 9 is reserved for the facsimile function and thirty sheets accommodated in the other sheet supply cassette 9 is reserved for the printer function.

According to the first embodiment of the invention, in the print based on the print job other than the specific job, the use of the amount corresponding to the part of the accommodated recording medium may be prohibited, and thus the recording medium may be secured for the specific job.

According to the second embodiment of the invention, the use of the recording medium is prohibited after the present amount of the accommodating unit is checked by the residual amount detecting unit. Therefore, the number of the recording media may be suitably managed.

According to the third embodiment of the invention, the recording media may be secured in association with the function.

According to the fourth embodiment of the invention, the recording media may be secured in association with the user, and thus the convenience of the user may be effectively enhanced.

According to the fifth embodiment of the invention, the prohibition of the use of the recording media may be managed on the basis of identification information. Accordingly, this invention is effective to a case where the prohibition of the use of the recording medium is restricted under a fixed condition.

According to the sixth embodiment of the invention, the unusable amount may be successively renewed according to the print of the specific job, and thus the unusable amount may be properly kept, so that the recording medium may be prevented from being secured by an excessive amount.

According to the seventh embodiment of the invention, the present invention is easily adaptable for variation of the situation like necessity of prohibition is subsequently vanished or the like.

According to the eighth embodiment of the invention, release of the prohibition state may be effectively prevented from being forgotten.

According to the ninth embodiment of the invention, a user may easily grasp that the recording medium cannot be normally secured, and thus the user may easily take a suitable countermeasure promptly.

According to the tenth embodiment of the invention, the use may be informed of the reason why the image formation is not carried out although the recording medium is accommodated.

While the invention has been described in connection with various embodiments, it will be understood by those skilled in the art that variations and modifications of the embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

What is claimed is:

1. An image forming apparatus comprises:
an accommodating unit configured to accommodate a plurality of recording mediums;
an image forming unit configured to form an image on the recording mediums in response to a print job;
a reservation unit configured to designate at least one of the plurality of the recording mediums as a reserved amount of an accommodated recording medium to prohibit use of the reserved amount by the image forming unit;
a determining unit configured to determine whether the print job is a specific print job or a non-specific print job; and
an authorizing unit configured to permit the image forming unit to use a residual amount of the accommodated recording medium for the specific print job irrespective of whether or not the residual amount of the accommodated recording medium is greater than the reserved amount of the accommodated recording medium, and configured to permit the image forming unit to use the residual amount of the accommodated recording medium for the non-specific print job only when the residual amount of the accommodated recording medium is greater than the reserved amount of the accommodated recording medium;
wherein the reservation unit is configured, if the residual amount of the accommodated recording medium is less than the reserved amount of the accommodated recording medium, to prohibit use of the residual amount for the non-specific print job.

2. The image forming apparatus according to claim 1, further comprising a detecting unit configured to detect the residual amount of the accommodated recording medium, wherein the authorizing unit permits the image forming unit to use an available amount of the accommodated recording medium equal to a difference between the residual amount and the reserved amount for print jobs other than the specific print job, and to use the residual amount for the specific print job.

3. The image forming apparatus according to claim 1, wherein the image forming apparatus comprises a multi-function apparatus that is configured to perform at least two of a copying function, a printer function and a facsimile function, the reservation unit designates the reserved amount in association with each function, and on the basis of which function generated the print job.

4. The image forming apparatus according to claim 1, wherein the determining unit is configured to identify a specific user originating the print job to determine whether the print job is the specific print job.

5. The image forming apparatus according to claim 1, further comprising an identification information input unit configured to receive identification information, and an authenticating unit configured to store at least one password and configured to confirm whether the identification information received by the identification information input unit corresponds to at least one of the at least one password, wherein when the authenticating unit confirms that the identification information corresponds to at least one of the at least one password, the reservation unit sets an amount corresponding to one or more of the recording mediums accommodated in the accommodating unit as the reserved amount and prohibiting use of the reserved amount corresponding to the one or more of the recording mediums by the image forming unit.

6. The image forming apparatus according to claim 1, wherein when the image forming unit forms the image on a predetermined amount of the recording mediums, the reservation unit sets a modified reserved amount equal to a difference between the reserved amount and the predetermined amount.

7. The image forming apparatus according to claim 1, further comprising a release unit configured to release the reserved amount set by the reservation unit.

8. The image forming apparatus according to claim 7, wherein the release unit is configured to release the reserved amount after a predetermined term.

9. The image forming apparatus according to claim 1, further comprising an indicating unit configured to identify an amount of the recording mediums as a reservation target amount by the reservation unit, and an alarm unit configured to emit an alarm when the identified amount is greater than a remaining amount of the recording mediums accommodated in the accommodating unit.

10. The image forming apparatus according to claim 1, further comprising an indicating unit configured to identify an amount of the recording mediums as a reservation target amount by the reservation unit, and an informing unit configured to inform a user when an available amount of the recording mediums which is not set as the reservation target amount is equal to zero.

* * * * *